(12) United States Patent
Mattson et al.

(10) Patent No.: US 7,806,002 B2
(45) Date of Patent: Oct. 5, 2010

(54) CAPACITIVE SENSING IN AN AUTOMOTIVE MIRROR

(75) Inventors: Keith E. Mattson, Livonia, MI (US);
David A. Hein, Sterling Heights, MI (US); Arjun V. Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 331 days.

(21) Appl. No.: 12/054,964

(22) Filed: Mar. 25, 2008

(65) Prior Publication Data

US 2009/0243634 A1     Oct. 1, 2009

(51) Int. Cl.
*G01L 9/12* (2006.01)
(52) U.S. Cl. .................... 73/724; 73/754; 359/512; 359/604
(58) Field of Classification Search .............. None
See application file for complete search history.

(56) References Cited

U.S. PATENT DOCUMENTS

| | | | | |
|---|---|---|---|---|
| 4,037,252 A | * | 7/1977 | Janssen | 369/44.28 |
| 4,305,071 A | * | 12/1981 | Bell et al. | 345/176 |
| 4,820,933 A | * | 4/1989 | Hong et al. | 307/10.1 |
| 5,300,784 A | * | 4/1994 | Fender et al. | 250/484.2 |
| 5,768,009 A | * | 6/1998 | Little | 359/293 |
| 5,821,501 A | * | 10/1998 | Zorn | 219/219 |
| 5,998,730 A | * | 12/1999 | Shiozaki et al. | 136/256 |
| 6,794,728 B1 | | 9/2004 | Kithil | |
| 6,850,824 B2 | | 2/2005 | Breed | |
| 7,091,886 B2 | | 8/2006 | DePue et al. | |
| 7,121,145 B2 | | 10/2006 | Silverbrook et al. | |
| 7,136,051 B2 | | 11/2006 | Hein et al. | |
| 7,137,302 B2 | | 11/2006 | Silverbrook et al. | |
| 7,180,017 B2 | | 2/2007 | Hein | |
| 7,191,661 B2 | | 3/2007 | Ohms et al. | |
| 7,194,901 B2 | | 3/2007 | Silverbrook et al. | |
| 7,202,859 B1 | | 4/2007 | Speck et al. | |
| 7,204,130 B2 | | 4/2007 | Koram et al. | |
| 7,221,359 B2 | | 5/2007 | Hein et al. | |
| 7,614,308 B2 | * | 11/2009 | Berner et al. | 73/724 |
| 2004/0118664 A1 | | 6/2004 | DePue et al. | |
| 2006/0025897 A1 | | 2/2006 | Shostak et al. | |
| 2007/0139173 A1 | | 6/2007 | Tang et al. | |

* cited by examiner

*Primary Examiner*—Lisa M Caputo
*Assistant Examiner*—Jermaine Jenkins
(74) *Attorney, Agent, or Firm*—Brooks Kushman P.C.

(57) ABSTRACT

An automotive mirror assembly includes a mirror and transparent substrate adjacent to the mirror. The patterned coating is attached to transparent substrate and defines at least part of capacitive element. A capacitance sensor is in communication with the patterned coating thereby allowing capacitance changes induced in the patterned coating to be monitored.

20 Claims, 5 Drawing Sheets

CAPACITIVE SENSING IN AN AUTOMOTIVE MIRROR

BACKGROUND OF THE INVENTION

1. Field of the Invention

The present invention is related to vehicle rearview mirror assemblies having capacitive proximity sensors for detecting the presence of an object close to the surface of a mirror.

2. Background Art

Advanced vehicle systems are constantly being developed by automobile manufactures in order to address customer desires and potentially provide a competitive advantage. Many such vehicle systems address aesthetic aspects of a vehicle appearance or methods of operation.

U.S. Pat. Appl. No. 20070114810 provides a system of remotely operating a head restraint in a vehicle. In the system of this application, the forwardly positioned vehicle occupant (i.e., the driver) is able to remotely operate a head restraint located in a rearward position. This functionality is provided by viewing the target head restraint in a rearview mirror and then positioning an object (e.g., a finger) proximate to the reflective image of the head restraint desired to be operated. A transmitter (e.g. transmitter) in the mirror assembly sends a signal to a receiver associated with the head restraint which in turn causes an actuator to move the head restraint. Variations of the system disclosed in U.S. Pat. Appl. No. 20070114810 utilize one or more capacitive sensors. Currently available "off the shelf" sensors are expensive and tend to interfere with rearview mirror reflectivity.

Accordingly, there exists a need for inexpensive capacitive sensors that do not significantly interfere with the reflection properties of a rearview mirror when incorporated therein.

SUMMARY OF THE INVENTION

The present invention solves one or more problems of the prior art by providing in at least one embodiment, an automotive mirror assembly having an incorporated capacitive sensor. The automotive mirror assembly includes a mirror and transparent substrate adjacent to the mirror. The patterned coating is attached to the transparent substrate and defines at least part of a capacitive element. A capacitance measuring device is in communication with the patterned coating thereby allowing capacitance changes induced in the patterned coating to be monitored.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
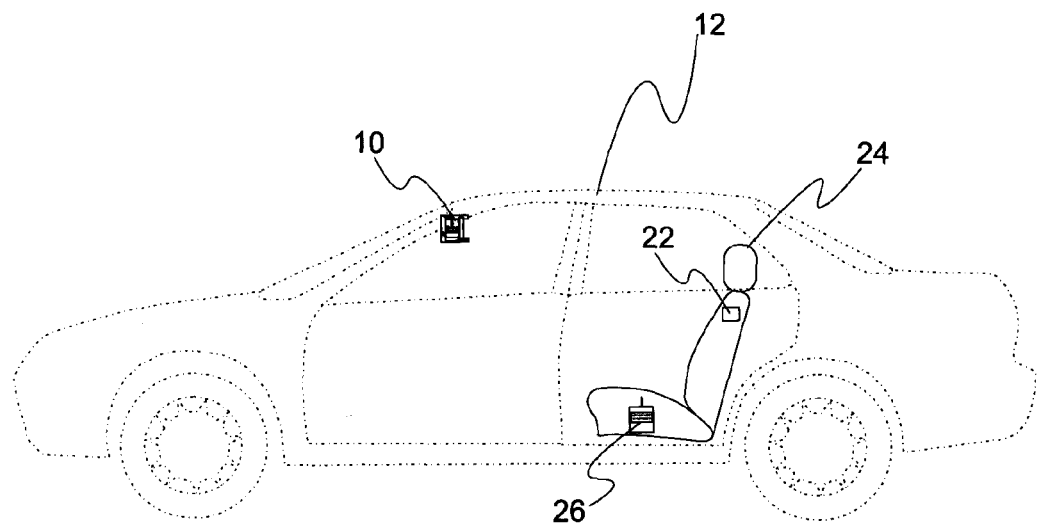
FIG. 1 is a schematic illustration depicting the incorporation of a remotely activated head restraint system in a vehicle.
Figure 2A:
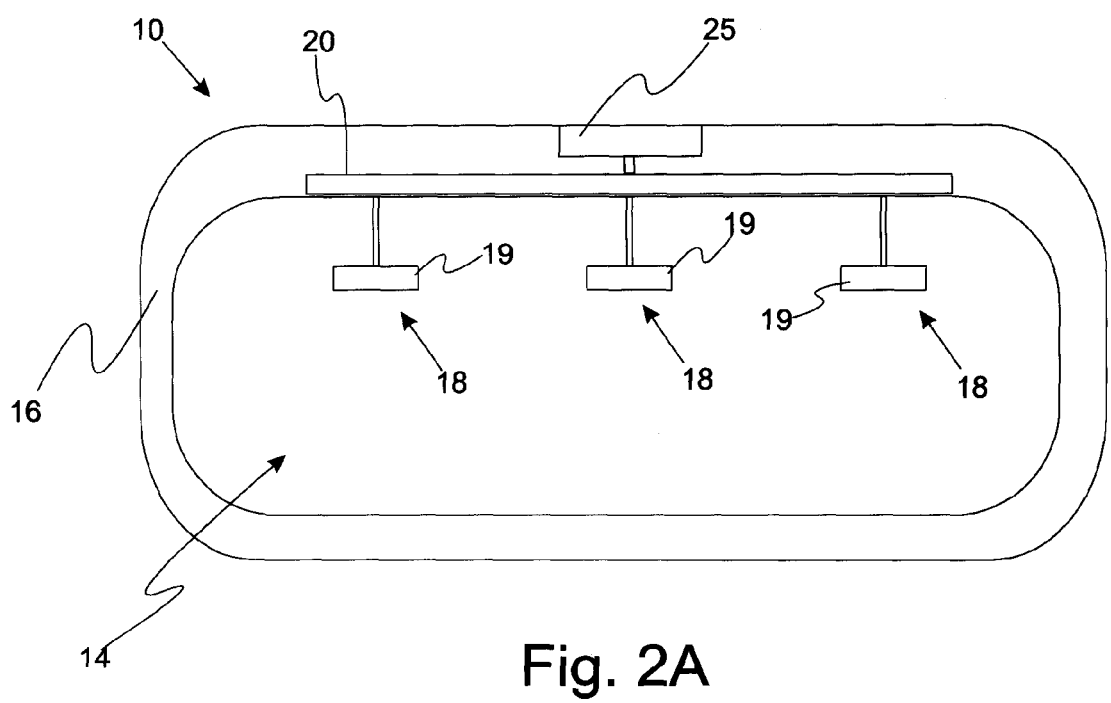
FIG. 2A is a front view of a variation of a rearview mirror assembly having one or more capacitive sensors included therein.
Figure 2B:
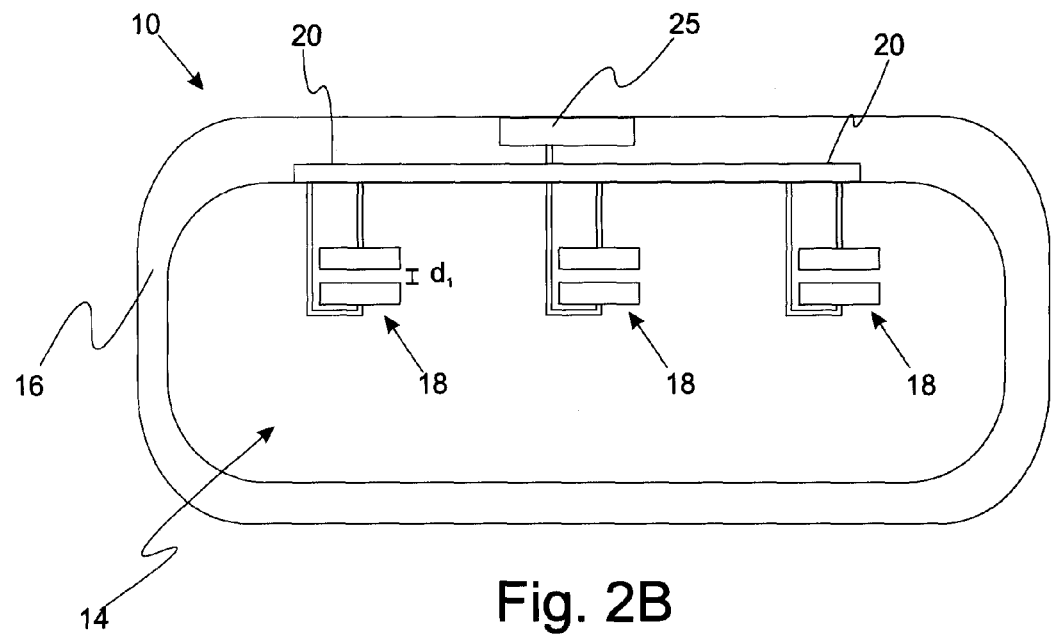
FIG. 2B is a front view of a variation of a rearview mirror assembly having one or more capacitive sensors included therein.

With reference to FIGS. 1, 2A, and 2B, schematic illustrations depicting a remotely actuated head restraint system using capacitance sensors are provided. Automotive mirror assembly 10 is mounted within vehicle 12. U.S. Pat. Appl. No. 20070114810 provides an example of a remotely actuated head restraint system which may utilize the automotive mirror assembly and capacitive sensors of the present invention. The entire disclosure of this patent application is hereby incorporated by reference in its entirety. FIG. 1 provides a schematic illustration of the incorporation of automotive mirror assembly 10 in vehicle 12. FIG. 2 provides a front view of automotive mirror assembly 10. Automotive mirror assembly 10 includes mirror subassembly 14 held within mirror frame 16. Capacitive sensors 18 are contained within mirror assembly 10. In a particularly useful variation, automotive mirror assembly 10 is a rearview mirror.

Referring to FIG. 2A, capacitive sensors 18 are in communication with capacitance monitor 20. Capacitance monitor 20 senses and/or measures capacitance changes in capacitve sensors 18. In accordance with U.S. Pat. Appl. No. 20070114810, the positioning of an object (e.g., a vehicle occupant's finger) in the vicinity of at least one of capacitive sensors 18 causes a change in the capacitance of that sensor which is observed by capacitance monitors 20. This capacitance change results in the operation of head restraint actuator 22 associated with that sensor as set forth in U.S. Pat. Appl. No. 20070114810. Operation of head restraint actuator 22 causes head restraint 24 to move from an upright to a folded position. In a further refinement, operation of head restraint actuator 22 also causes head restraint 24 to move from a folded to an upright position. The variation depicted in FIG. 2A provides a single electrode 19 included in mirror assembly 10 with the capacitance circuit being completed when a user places an object (i.e., a finger) in the vicinity of electrode 19. FIG. 2B depicted a variation in which two capacitance electrodes separated by distance $d_1$ are patterned within mirror assembly 10.

FIGS. 2A and 2B also depict a variation in which automotive mirror assembly 10 includes transmitter 25 in communication with receiver 26. In these variations, a signal is sent to receiver 26 when one of capacitive sensors 18 observes a capacitance change. Receiver 26, which is in communication with head restraint actuator 22, causes actuation as set forth above.

Figure 3A:
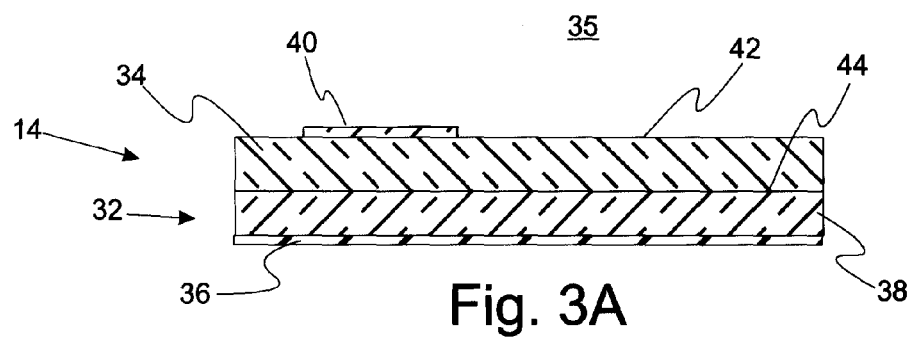
FIG. 3A is a cross section showing a capacitive element disposed on a surface facing away from a mirror subassembly.
Figure 3B:
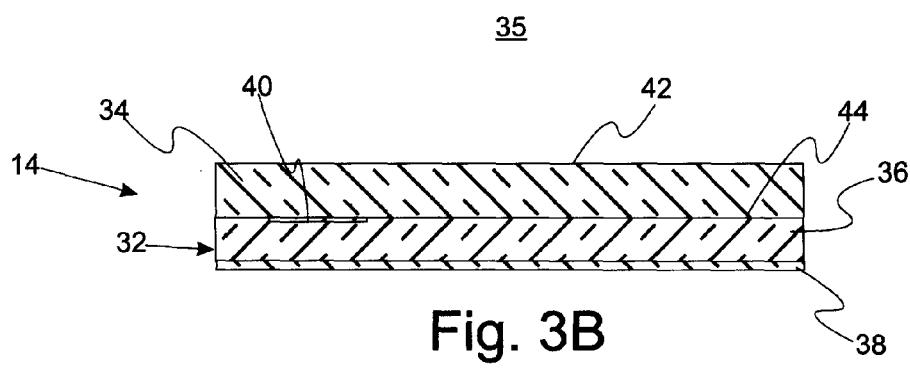
FIG. 3B is a cross section showing a capacitive element disposed on a surface adjacent to a mirror subassembly.
Figure 3C:
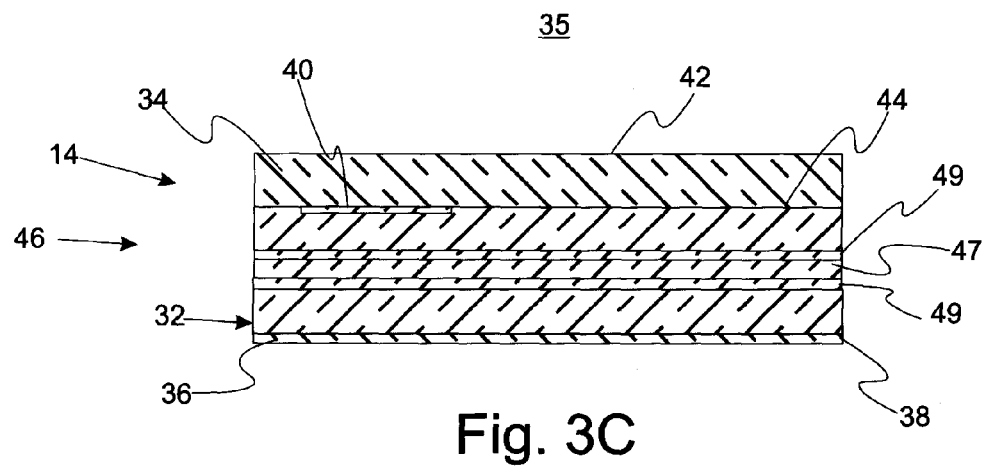
FIG. 3C is a cross section showing a capacitive element disposed on a surface adjacent to a mirror subassembly which includes a tinting component.

Referring to FIGS. 3A, 3B, and 3C, automotive mirror subassembly 14 includes mirror 32 and transparent substrate 34. In these variations, automotive mirror subassembly 14 is viewed from position 35. In a variation of the present embodiment, mirror includes reflective coating 36 disposed on substrate 38. Typically, reflective coating 36 may be a single layer coating or a multilayer stack which includes a metal or metalloid material. Suitable metals include, but are not limited to, aluminum, silver, titanium, and the like. Transparent substrate 34 and substrate 38 are each typically a glass or plastic substrate.

Still referring to FIGS. 3A, 3B, and 3C, patterned coating 40 is attached to transparent substrate 34. In the variation depicted in FIG. 3A, patterned coating 40 is disposed over surface 42 which is facing away from mirror 32. In the variation depicted in FIG. 3B, patterned coating 40 defines at least part of capacitive sensor 18. In the variation depicted in FIG. 3B, patterned coating 40 is disposed over surface 44 which is an internal surface. Capacitance monitor 20 is in communication with patterned coating 40 as set forth above. FIG. 3C provides a variation which includes tinting component 46. In a refinement tinting component 46 includes polymer layer 47 disposed between transparent electrodes 48 and 49.

In order for patterned coating 40 to function as a capacitor, patterned coating 40 comprises an electrically conductive material. Typically, the conductive material is a thin film adhering to the glass substrate. In a particularly useful variation, patterned coating 40 includes a transparent electrical conductor. The transparent feature makes capacitive element nearly invisible to a vehicle occupant with minimal interference with the reflective properties of the mirror assembly 14. Examples of useful transparent electrical conductors include, but are not limited to, doped or undoped tin oxide, indium tin oxide, a doped or undoped zinc oxide, and combinations thereof. In another variation of the present embodiment, patterned coating 40 comprises an electrically conductive material that is a metal.

In a variation of the present embodiment as depicted in FIGS. 3A and 3B, patterned conducive coating 40 defined a pattern having first electrode or a first electrode and second electrode section as set forth above.

Figure 4:
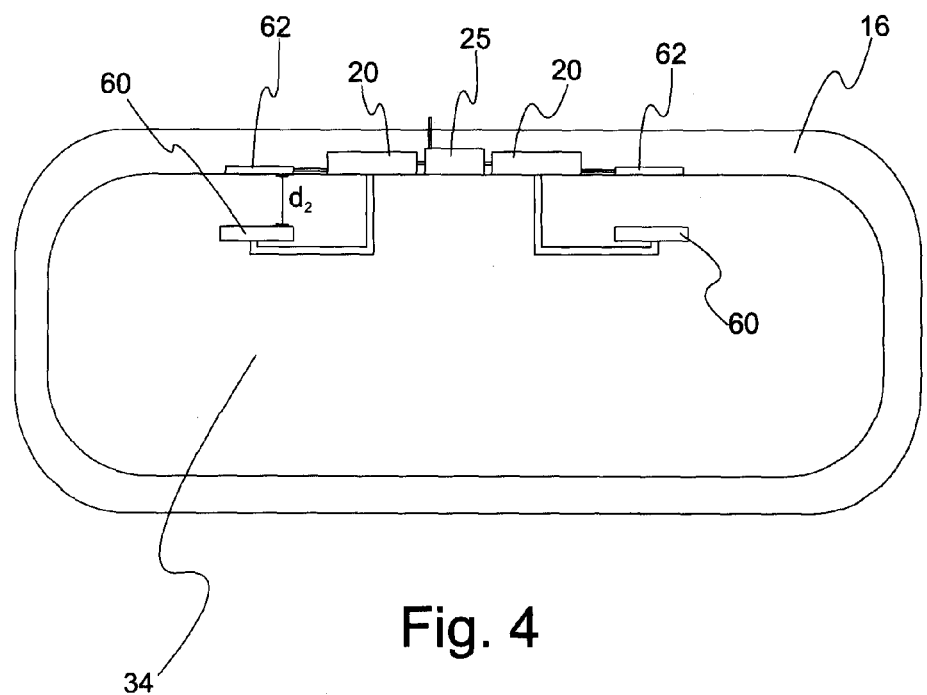
FIG. 4 is a front view of a variation of a rearview mirror assembly having a capacitive sensor with an electrode visually obscured by a rearview mirror frame.

With reference to FIG. 4, a variation of the present embodiment in which an electrode of capacitive sensor 18 is hidden by frame 16 is provided. In this variation, patterned coating 40 defines first electrode 60 which is proximate to transparent substrate 34. In a refinement of this variation, patterned coating 40 defines second electrode 62 separated from first electrode 60 by a predefined distance $d_2$. In this refinement second electrode 62 is hidden from a vehicle occupant by frame 16. In another refinement, second electrode is a metal strip or plate.

Figure 5A:
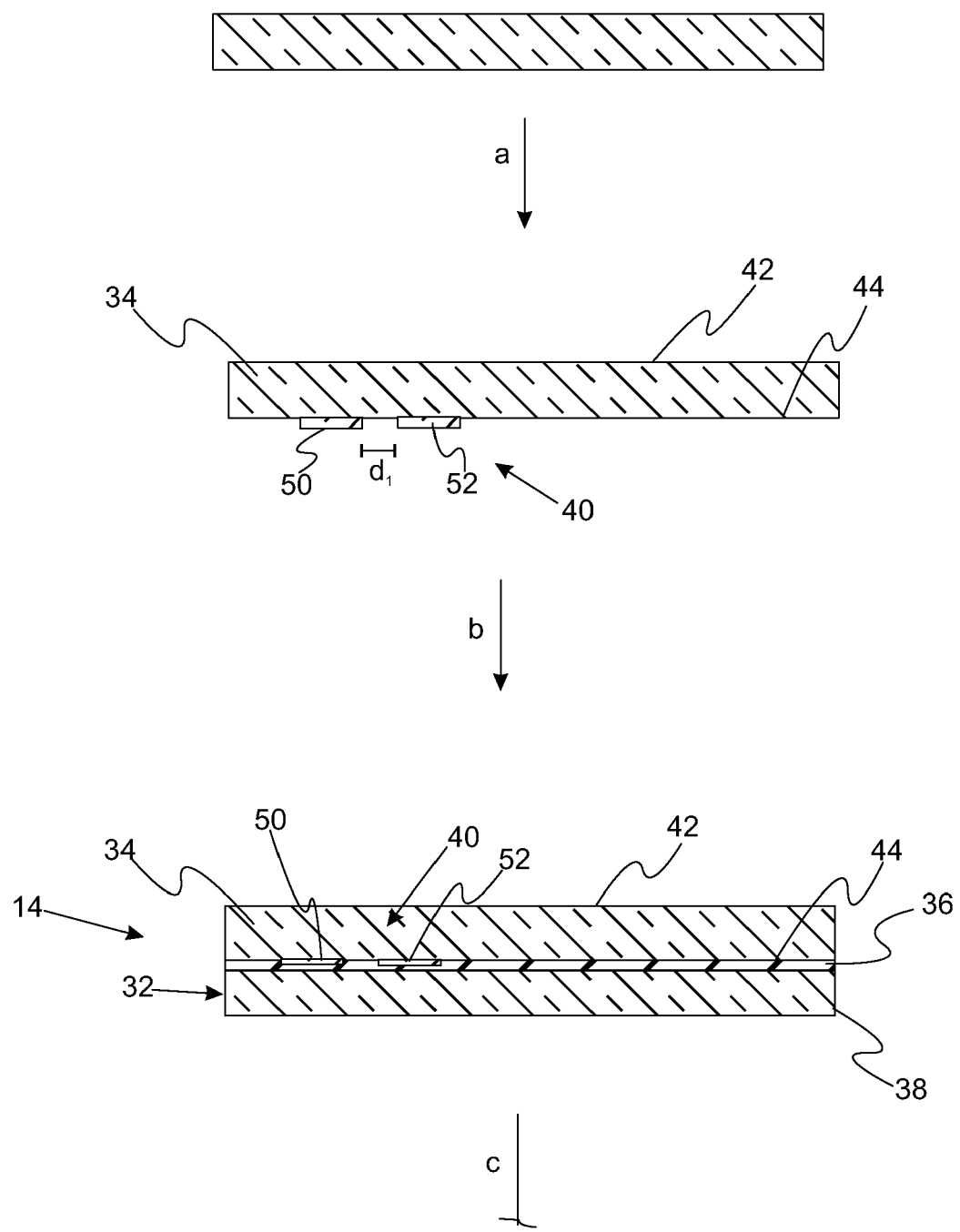
FIGS. 5A and 5B provide a schematic flowchart illustrating the fabrication of the rearview mirror assemblies of FIGS. 1 through 4.
Figure 5B:
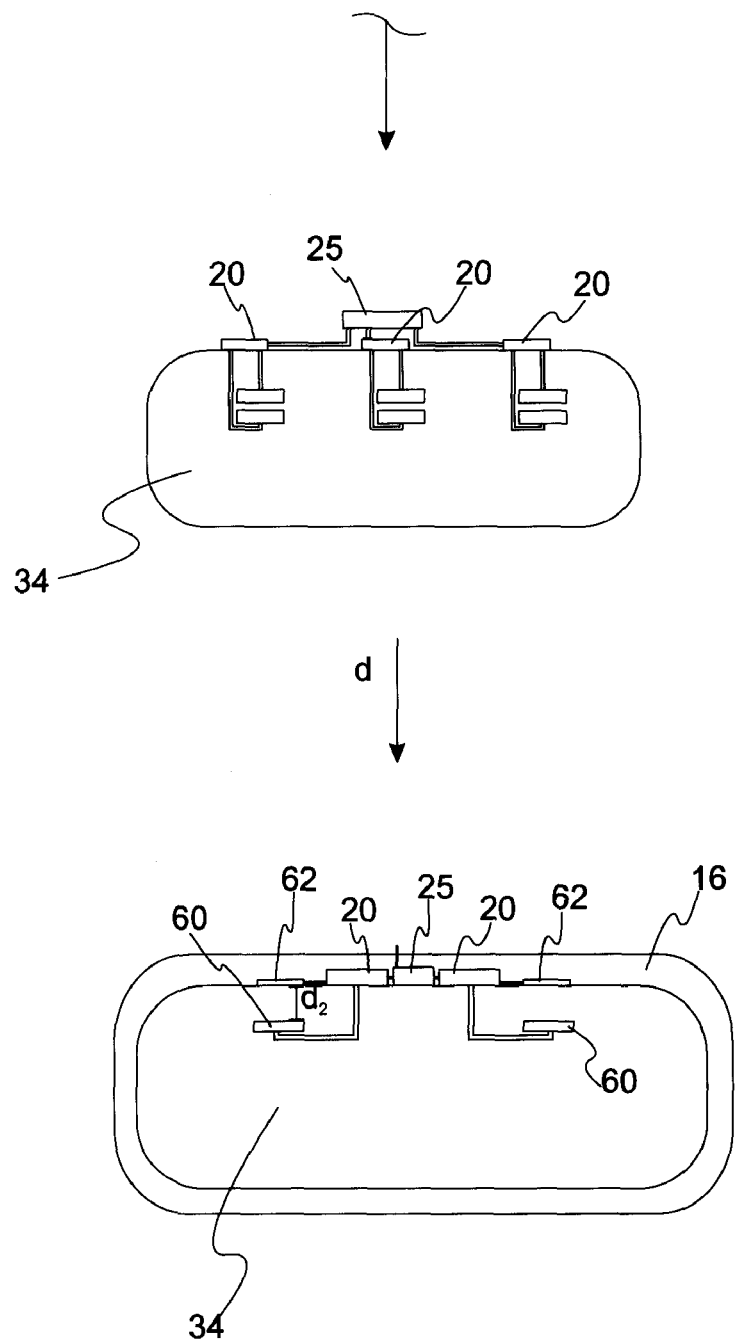

With reference to FIGS. 5A and 5B, a schematic flowchart illustrating the fabrication of the automotive mirror assemblies set forth above is provided. In step a) an electrically conductive material is deposited on transparent substrate 34 to form a patterned coating 40. As set forth above, patterned coating 40 at least partially defines capacitive sensor 18. Transparent substrate 34 is positioned adjacent to mirror 32 to form the automotive mirror assembly 14 in step b). In step c), electrical communication is established between patterned coating 40 and capacitance measuring devices or monitors 20. Finally, in step d), automotive mirror assembly 14 is mounted in frame 16.

The electrically conductive material may be deposited onto transparent substrate 34 by any number of methods known to one skilled in the art. Examples include, but are not limited to, sputtering, chemical vapor deposition, and screen printing. In another variation, the electrically conductive material is deposited from an ink composition.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An automotive mirror assembly comprising:
   a mirror;
   a transparent substrate proximate to the mirror;
   a patterned coating on the transparent substrate, the patterned coating defining at least a portion of a capacitive element; and
   signal monitor in communication with the patterned coating, the signal monitor for monitoring capacitive changes in the patterned coating.

2. The automotive mirror assembly of claim 1 wherein the patterned coating comprises an electrically conductive material.

3. The automotive mirror assembly of claim 2 wherein the conductive material comprises a transparent electrical conductor.

4. The automotive mirror assembly of claim 3 wherein the conductive material comprises a doped or undoped tin oxide, indium tin oxide, a doped or undoped zinc oxide, and combinations thereof.

5. The automotive mirror assembly of claim 3 wherein the conductive material comprises a metal.

6. The automotive mirror assembly of claim 3 wherein the conductive material is a thin film adhering to the transparent substrate.

7. The automotive mirror assembly of claim 1 wherein the patterned conducive coating defined a pattern having a first electrode section and a second electrode section such that the first electrode section is separated from the second electrode section by a predetermined distance.

8. The automotive mirror assembly of claim 1 further comprising a first electrode proximate to the transparent substrate.

9. The automotive mirror assembly of claim 8 wherein the patterned coating defined a second electrode separated from the first electrode by a predefined distance.

10. The automotive mirror assembly of claim 1 wherein the patterned conducive coating has a capacitance that changes when an object is sufficiently close to a predefined location on the transparent substrate.

11. The automotive mirror assembly of claim 8 wherein the predetermined position corresponds positions at which rearwardly placed objects in a vehicle appear when viewed by a vehicle operator.

12. The automotive mirror assembly of claim 8 wherein the rearwardly placed objects are electronically operated head restraints.

13. The automotive mirror assembly of claim 8 wherein the signal monitor comprises a transmitting module for transmitting a signal to a rearwardly positioned vehicle component.

14. An automotive mirror assembly comprising:
   a mirror;
   a transparent substrate adjacent to the mirror;
   a patterned electrically conductive coating on the transparent substrate, the coating defining at least a portion of a capacitive element; and
   an RF transmitter in communication with the patterned coating, the transmitter sending signals in response to a change in capacitance of the patterned coating.

15. The automotive mirror assembly of claim 1 wherein the electrically conductive coating is substantially transparent.

16. A method of forming an automotive mirror assembly, the method comprising:
   a) depositing an electrically conductive material on a transparent substrate to form a patterned coating, the patterned coating defining a capacitor thereon;
   b) positioning the transparent substrate adjacent to a mirror to form the automotive mirror assembly; and
   c) providing electrical communication between the patterned coating and a capacitance monitor.

17. The method of claim 16 wherein the electrically conductive material is deposited on the transparent substrate by sputtering.

18. The method of claim 16 wherein the electrically conductive material is deposited on the transparent substrate by chemical vapor deposition.

19. The method of claim 16 wherein the electrically conductive material is deposited from an ink composition.

20. The method of claim 19 wherein the electrically conductive material is deposited by screen printing.

* * * * *